United States Patent US 11,536,396 B2
Ruddick et al. (45) Date of Patent: Dec. 27, 2022

(54) CABLE RESTRAINT AND METHOD OF SECURING A CABLE

(71) Applicant: D-Line (Europe) Limited, North Shields (GB)

(72) Inventors: Paul Ruddick, North Shields (GB); Stephen Bianchi, North Shields (GB)

(73) Assignee: D-LINE (EUROPE) LIMITED, North Shields (GB)

( * ) Notice: Subject to any disclaimer, the term of this patent is extended or adjusted under 35 U.S.C. 154(b) by 0 days.

(21) Appl. No.: 17/281,939

(22) PCT Filed: Sep. 30, 2019

(86) PCT No.: PCT/EP2019/076462
§ 371 (c)(1),
(2) Date: Mar. 31, 2021

(87) PCT Pub. No.: WO2020/070072
PCT Pub. Date: Apr. 9, 2020

(65) Prior Publication Data
US 2021/0372542 A1 Dec. 2, 2021

(30) Foreign Application Priority Data
Oct. 1, 2018 (GB) ..................................... 1816039

(51) Int. Cl.
*F16L 3/00* (2006.01)
*F16L 3/10* (2006.01)
(Continued)

(52) U.S. Cl.
CPC ............. *F16L 3/1033* (2013.01); *F16L 3/127* (2013.01); *H02G 3/32* (2013.01)

(58) Field of Classification Search
None
See application file for complete search history.

(56) References Cited

U.S. PATENT DOCUMENTS 2,819,858 A * 1/1958 Mittendorf .............. F25D 21/08
248/500
3,951,367 A 4/1976 Hagelberg
(Continued)

FOREIGN PATENT DOCUMENTS

DE 7529497 U 1/1976
DE 2835566 A1 3/1979
(Continued)

OTHER PUBLICATIONS

ISA European Patent Office, International Search Report Issued in Application No. PCT/EP2019/076462, dated Nov. 13, 2019, WIPO, 4 pages.

*Primary Examiner* — Steven M Marsh
(74) *Attorney, Agent, or Firm* — Alleman Hall Creasman & Tuttle LLP

(57) ABSTRACT

A cable restraint has: a first arm, having a first proximal end, a first distal end, and a first gripping portion located at the first distal end; a second arm, having a second proximal end, a second distal end and a second gripping portion located at the second distal end; wherein: the first proximal end is joined to the second proximal end, and the cable restraint is movable between: an open configuration in which the first gripping portion and the second gripping portion are spaced from each other to define a gap into which a cable may be inserted, and a closed configuration in which the first gripping port and the second gripping portion cooperate with each other to define a cable restraint channel.

28 Claims, 14 Drawing Sheets

(51) Int. Cl.
*F16L 3/127* (2006.01)
*H02G 3/32* (2006.01)

(56) References Cited

U.S. PATENT DOCUMENTS

| | | | |
|---|---|---|---|
| 7,758,197 B2 * | 7/2010 | Choi | G02F 1/133608 |
| | | | 362/632 |
| D653,941 S * | 2/2012 | Yasher | D8/395 |
| 9,903,510 B2 * | 2/2018 | Joshi | F16L 3/1075 |
| 10,637,226 B2 * | 4/2020 | Bell | H02G 7/053 |

FOREIGN PATENT DOCUMENTS

| | | | | |
|---|---|---|---|---|
| DE | 19500716 A1 | 5/1996 | | |
| FR | 2263409 A1 | 10/1975 | | |
| WO | 03033954 A1 | 4/2003 | | |
| WO | 2017149271 A1 | 9/2017 | | |
| WO | WO-2017149271 A1 * | 9/2017 | | F16B 5/0685 |

* cited by examiner

CABLE RESTRAINT AND METHOD OF SECURING A CABLE

The present invention relates to a cable restraint for securing a cable to a surface, and a method of using the cable restraint.

BACKGROUND TO THE INVENTION

It is desirable to provide cable restraints which are able to fix a cable securely to a given surface. However, often increased security comes at the price of increasing the complexity with which a cable restraint can be installed. For example, consider the restraint as described in WO 2017/149271. Here, the cable must be passed through the loop and only then can the restraint be placed in a pre-formed hole. Furthermore, the installer must press against the sharp barbs on the arms in order to bring the arms sufficiently close together to enter the hole. Alternatively, the restraint may be placed into a pre-formed hole, and the cable can be threaded through. Both of these are fiddly tasks.

SUMMARY OF THE INVENTION

The present invention aims to provide a cable restraint which is improved in terms of ease of use, without making sacrifices in terms of security.

Specifically, a first aspect of the present invention provides a cable restraint having: a first arm, having a first proximal end, a first distal end, and a first gripping portion located at the first distal end; a second arm, having a second proximal end, a second distal end and a second gripping portion located at the second distal end; wherein: the first proximal end is joined to the second proximal end, and the cable restraint is movable between: an open configuration in which the first gripping portion and the second gripping portion are spaced from each other to define a gap into which a cable may be inserted, and a closed configuration in which the first gripping portion and the second gripping portion cooperate with each other to define a cable restraint channel.

Cable restraints according to the present invention are advantageous because they are easier to install than the cable restraints described in e.g. WO 2017/149271. In particular, a second aspect of the invention provides a method of securing a cable to a surface using the cable restraint of the first aspect of the invention, the surface having a notch or hole formed therein, the notch or hole having an edge, the method including the steps of: while the cable restraint is in the open configuration, inserting the first proximal end and the second proximal end into the notch or hole such that part of the first arm or the second arm is in contact with the edge; locating the cable in the gap defined by the first gripping portion and the second gripping portion; and pressing the cable restraint further into the notch or hole, such that a force exerted by the edge of the cable on the first arm or the second arm causes the cable restraint to move from the open configuration to the closed configuration, to secure the cable in the cable restraint channel so formed.

In some embodiments of the invention, in the open configuration, the gap defined by the first gripping portion and the second gripping portion is located on an opposite side of the first gripping portion from the first arm, and on an opposite side of the second gripping portion from the second arm. In this way, when the proximal ends of the first and second arms are inserted into a pre-formed pilot hole, formed by e.g. a drill, the cable can be inserted into the still-present gap between the first gripping portion and the second gripping portion. In some embodiments, in the open configuration, the first gripping portion is not in contact with the second gripping portion. This ensures that there is minimum obstruction so that the cable can be inserted when some or all of the proximal ends of the first and second arm are inside the pre-formed pilot hole, as discussed.

In some embodiments of the invention, the cable restraint is resiliently deformable. Furthermore, the cable restraint may be biased into the open configuration. The biasing preferably arises a result of the resiliently deformable nature of the cable restraint. Alternatively, the cable restraint may further include some kind of biasing means, such as a spring (either a coil spring or a leaf spring), arranged to bias the cable restraint into the open configuration. In embodiments in which the cable restraint is biased into the open configuration (as a result of its resiliently deformable nature or otherwise), when the first arm and the second arm are located in a hole, the biasing acts to impart an outward force to the walls of the hole, securing the cable restraint in place. This can also mean that when the cable restraint is removed from e.g. a wall or a floor, it may be reused.

In some embodiments, the cable restraint may be V-shaped or substantially V-shaped in the open configuration. Specifically, in the open configuration, the first arm and the second arm may be arranged substantially in a V-shape. The first arm may include a first elbow, and the second arm may include a second elbow. In this way, during installation of a cable, before the cable is inserted, the portions of the first and second arms below the elbows can be wedged into the hole while the installer obtains the cable. In some embodiments, the first elbow may be located approximately halfway along the first arm, and the second elbow is located approximately halfway along the second arm.

In some embodiments, the first arm is pivotable towards the second arm, in order to move the cable restraint from the open configuration to the closed configuration. The fulcrum about which the first arm and second arm are able to pivot relative to each other is located at or near the point where the first proximal and the second proximal end are joined.

On a related note, in some embodiments, the first proximal end may be joined directly to the second proximal end. Alternatively, the first proximal end may be joined to the second proximal end via a connector portion. It is preferred that the connector portion is in the form of a short piece of material connected between the first proximal end and the second proximal end. The dimensions of the connector portion may be selected by the manufacturer depending on the dimensions of the holes in which the cable restraint is to be inserted. Having a connector portion may be advantageous in that may give rise to an increased degree of bias into the open configuration.

The first arm, the second arm and, optionally, the connector portion are preferably integrally formed with each other. More preferably, and along a similar vein, the first arm, the second arm and, optionally, the connector portion are formed from a single strip of material. This is beneficial from a manufacturing perspective, and also gives rise to material advantages, such as the fact that the cable restraint acts to bend in response to external forces, rather than to break.

In other embodiments, rather than being in the form of a strip of material, which should be understood in the present context to be in the form of an elongate, thin sheet of metal, the cable restraint may be formed from a single metal wire. This is advantageous in that it may fit into smaller pre-formed holes.

Preferably, the material is metal, such as sprung steel. Sprung steel is particularly advantageous since it provides a high degree of resilient deformability (and thus a strong bias into the open configuration). Furthermore, it has a high melting point of around 1200° C., which is advantageous from a fire safety perspective. For example, in case of fire, the plastic coating of a cable or conduit may melt, but the cable restraints of the present invention will not, and will therefore prevent the hazards associated with bare electrical cables falling to cause potentially fatal cable entanglements.

A top surface of the cable restraint channel defined by the first gripping portion and second gripping portion in the closed configuration is preferably rounded. This is more ergonomic, as the user has only to press on a rounded surface in order to firmly implant the cable restraint in the wall in question. Alternatively, the top surface may be flat.

There are numerous ways in which the first gripping portion and the second gripping portion may "cooperate" when the cable restraint is in the closed configuration. In some embodiments, the first gripping portion and the second gripping portion may be in contact with each other in the closed configuration. In particular, the first gripping portion may overlap the second gripping portion in the closed configuration. This arrangement ensures a secure cable restraint channel is defined.

In some embodiments, the first gripping portion and the second gripping portion may include a locking mechanism, configured to secure the cable restraint into the closed configuration. For example, the first gripping portion may include a tab, and the second gripping portion may include a corresponding slot, configured to receive the tab. In some embodiments, the tab may be arranged in a manner whereby when it is inserted through the slot, the tab can be folded back on itself to secure the cable restraint in the closed position. The tab is preferably an integral tab.

The first distal end and/or the second distal end may include a pointed portion.

In some embodiments, a cross-section of the first and/or second gripping portion may be arcuate, and in particular a circular arc. This means that cable restraint channel defined by the first gripping portion and second gripping portion may be circular or substantially circular in cross-section. For example, a cross-section of the first gripping portion may be semi-circular, and a cross-section of the second gripping portion may be semi-circular.

In some embodiments cross-section of the first gripping portion and a cross-section of the second gripping portion may have different circumferential extents. This can give rise to the advantageous overlapping discussed above.

Rather than being in contact with each other, the first gripping portion and the second gripping portion may be spaced apart to define a gap in the closed configuration, the gap being smaller than the gap defined by the first gripping portion and second gripping portion in the open configuration. More preferably, the gap should be smaller than the width of any cable to be used in the cable restraint, to ensure that the cable is unable to come free of the restraint.

In order to give rise to such a gap, the first arm may include a first abutment portion and the second arm may include a second abutment portion, the first abutment portion and the second abutment portion arranged to be in contact with each other when the cable restraint is in the closed configuration. The size of the abutment portions may be selected specifically to ensure that a gap remains between the first gripping portion and the second gripping portion when the cable restraint is in the closed configuration. However, alternatively, the abutment portions may be arranged to contact each other, and prevent further closing of the cable restraint only when a predetermined degree of overlap between the first gripping portion and the second gripping portion has been attained.

The cable restraint is preferably movable from the open configuration to the closed configuration by a closing force which is applied to the first arm and/or the second arm in a direction which is parallel or substantially parallel to a line bisecting an angle between the first arm and the second arm. So, when the device is inserted into a hole, the edges of that hole exert a reaction force on the arms which is opposite to the direction in which the cable restraint is moving. That reaction force has a component which causes the first arm and the second arm to move together, thus entering the closed configuration. Alternatively put, the cable restraint is preferably configured to be movable from the open configuration to the closed configuration when the cable restraint is inserted into a hole or notch having a smaller width than the cable restraint.

In the closed configuration, the cable restraint may have an elongate or substantially elongate shape, defining a length direction parallel to a long axis of the elongate shape, and a width direction perpendicular to the long axis of the elongate shape. In such embodiments, it is preferred that (in the closed configuration) a greatest width of the cable restraint in the region containing the first arm, the second arm, and optionally the connector portion, is narrower than the width of the cable restraint channel defined by the first gripping portion and the second gripping portion. In this way, it can be ensured that the cable restraint channel does not enter the hole, in use. In the closed configuration, the cable restraint preferably has a maximum length of 50 mm. The cable restraint channel preferably has a maximum width of 10 mm. In the closed configuration, the maximum width of the portion of the cable restraint including the first arm and the second arm is preferably no more than 8 mm.

In some embodiments, when in the open configuration, the angle between the first arm and the second arm is between 30° and 60° (inclusive). In the closed configuration, the angle between the first arm and the second arm may be less than 30°, preferably 20° or less. Here, in order to account for embodiments of the invention in which the first arm and second arm are not straight, the "angle" is considered the angle between the imaginary lines joining the centre of the connector portion, or the centre of the join, or the point at which the two arms are connected, and the opposite end of the arm, which may be the point at which the arm becomes the gripping portion.

In some embodiments, the first arm and/or the second arm may include one or more barbs pointing towards the first gripping portion and/or the second gripping portion. In particular, there may be one, two or three barbs in each arm. The one or more barbs are preferably integrally formed with the arm in which they are located and in particular may comprise pointed portions of the arm in which they are located which have been bent out of the plane of the arm towards the outer surface of that plane of the arm. Having barbs arranged in this manner, when the first arm and the second arm are inserted into the hole, such that the barbs contact the inner surface of the hole, when a force acts to remove the cable restraint from the hole, the barbs engage with the wall and dig into it, preventing removal. This gives rise to an altogether more secure cable restraint. This is particularly preferable in combination with a resiliently deformable cable restraint.

While the above description focuses on cable restraints, it should be stressed that the invention could equivalently be used to restrain other structures such as pipes, and conduits.

BRIEF DESCRIPTION OF THE DRAWINGS

Embodiments of the invention will now be described with reference to the accompanying drawings, in which.

DETAILED DESCRIPTION OF THE DRAWINGS

Figure 1:
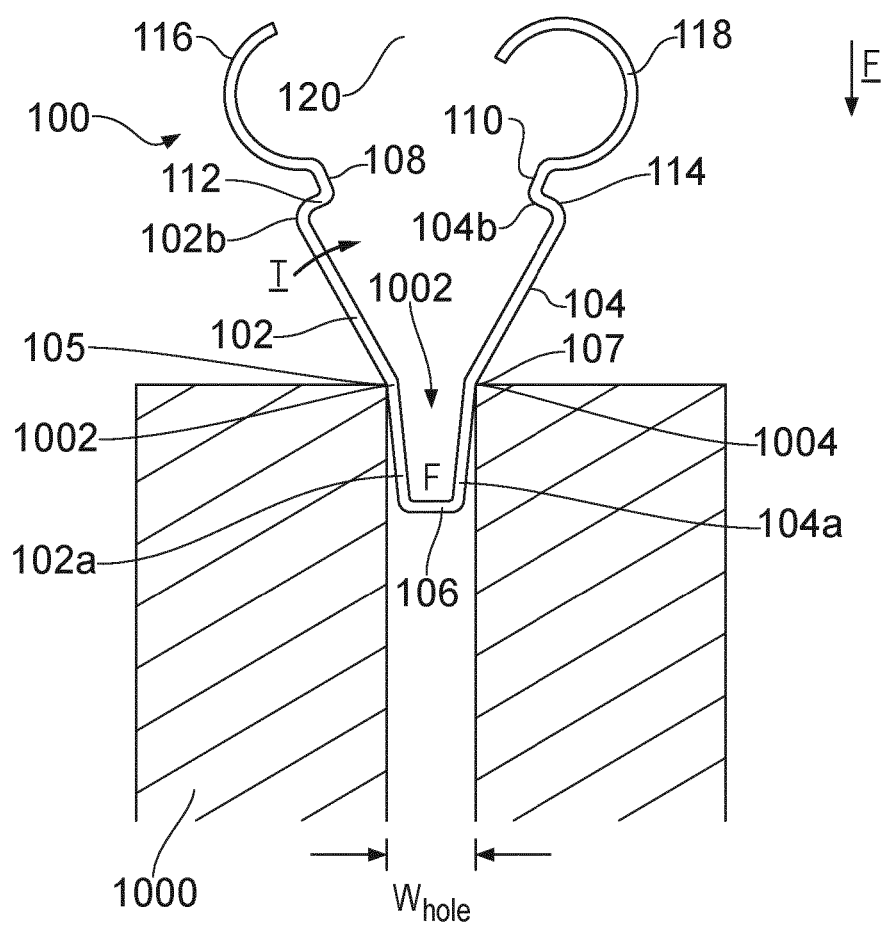
FIG. 1 shows a cable restraint in the open configuration.

FIG. 1 shows a cable restraint 100 according to an embodiment of the present invention. Specifically, in FIG. 1 the cable restraint 100 is shown in the open configuration, partially inserted into pilot hole 1001 in substrate 1000. Cable restraint 100 is made up of a first arm 102 having a proximal end 102a and a distal end 102b, a second arm 104 having a proximal end 104a and a distal end 104b, a connector portion 106, connecting the proximal end 102a of the first arm 102 and the proximal end 104a of the second arm 104. In the embodiment shown, the connector portion 106 is in the form of a short piece of metal. At the distal end 102b of the first arm 102 is abutment portion 108. The bend in the metal between the abutment portion 108 and the first arm 102 is referred to herein as the shoulder 112. Similarly, at the distal end 104b of the second arm 104 is abutment portion 110. Shoulder 114 is located at the boundary of the second arm 104 and the abutment portion 110. In FIG. 1, the abutment portions 108, 110 are in the form of a protruding fold of metal having a flat surface, each configured to abut with the other when the cable restraint 100 is in the closed configuration.

On the opposite side of abutment portion 108 from first arm 102 is the first gripping portion 116. In the cross-section shown, the first gripping portion 116 is in the form of a circular arc, making up just under half of the circumference of a circle. On the opposite side of abutment portion 110 from the second arm 104 is the second gripping portion 118. In the cross-section shown, the second gripping portion 118 is also in the form of a circular arc, making up slightly more than half of a circle. A gap 120 is located between the first gripping portion 116 and the second gripping portion 118, the gap 120 being sized to receive a cable (not shown) into.

The cable restraint 100 is resting partially inside hole 1001 in substrate 1000. The hole 1001 may be in the form of a cylindrical bore as may be produced by a conventional drill. Elbows 105, 107 located respectively in first arm 102 and second arm 104 rest on edges 1002, 1004 of the hole, so that the majority of the cable restraint (including the first gripping portion 116 and second gripping portion 118) are located outside the hole 1001.

Before describing the closed configuration of the cable restraint 100, we describe the process by which the cable restraint 100 is moved from the open configuration to the closed configuration. As a downwards (in the direction of the drawing) force F is applied on the cable restraint 100 (shown by the arrow), the cable restraint 100 is forced into hole 1001. However, given that the width of the hole 1001 is fixed at Whole, as the cable restraint 100 enters the hole, the first arm 102 and the second arm 104 move together. Specifically, the first arm 102 and the second arm 104 pivot towards each other, about a fulcrum F located in the region of the connector portion 106. In other words, in the frame of reference of the cable restraint 100, the reaction force acting vertically upwards on e.g. the first arm 102 gives rise to an instantaneous clockwise torque T acting to cause the first arm 102 to rotate clockwise, and move towards the second arm 104.

Because the gripping portions 116, 118 are attached rigidly to their respective arms 102, 104, the gripping portions 116, 118 also move towards each other, closing gap 120. When the abutment portions 108, 110 come into contact with each other, the cable restraint 100 is in the closed configuration.

Figure 2:
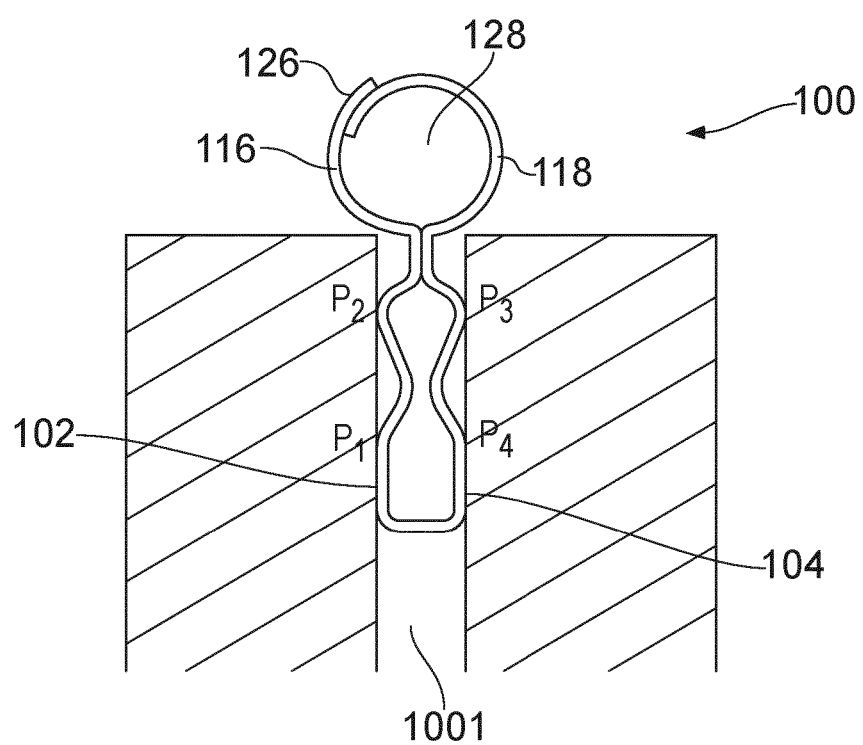
FIG. 2 shows the cable restraint of FIG. 1 in the closed configuration.
Figure 3A:
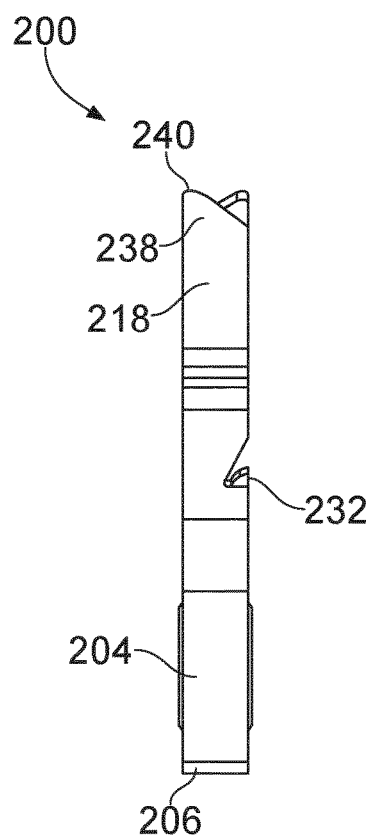
FIGS. 3A to 3D shown alternative views of another embodiment of a cable restraint of the present invention.
Figure 3B:
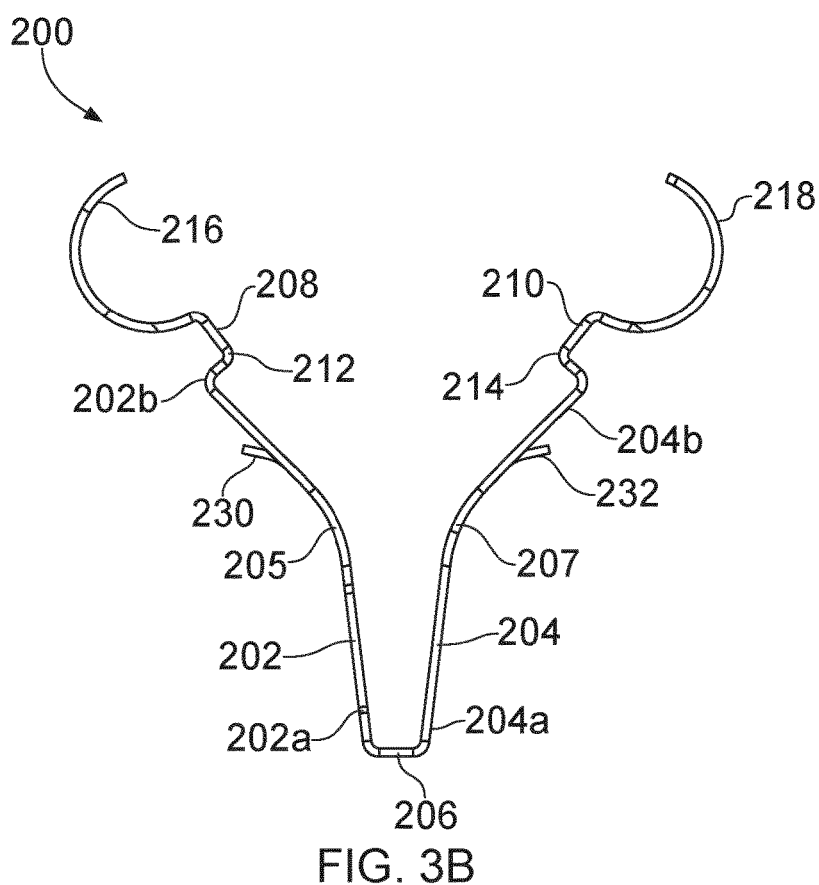
Figure 3C:
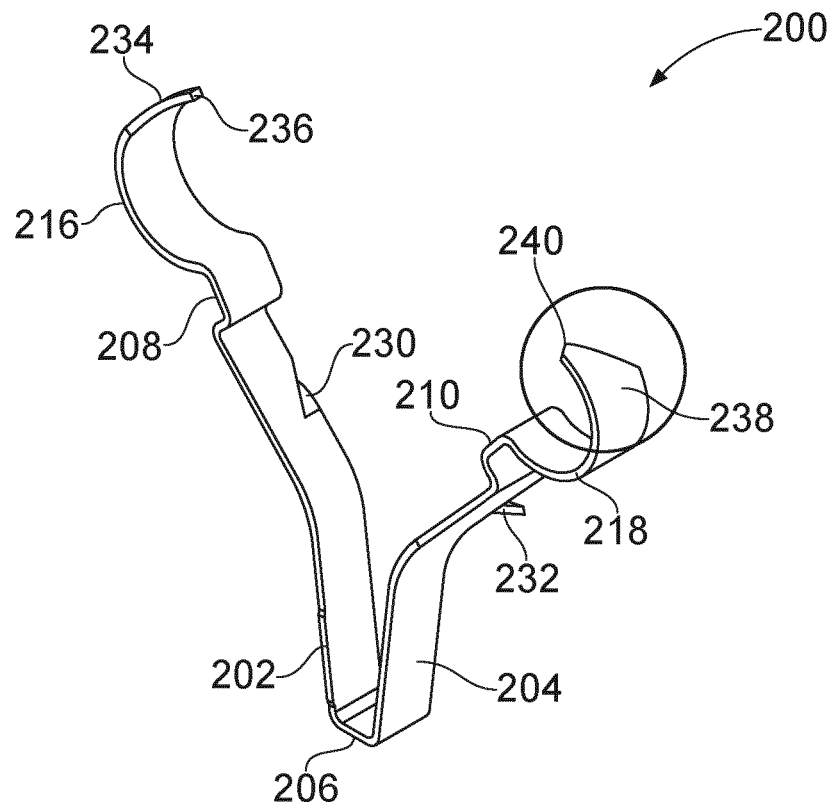
Figure 3D:
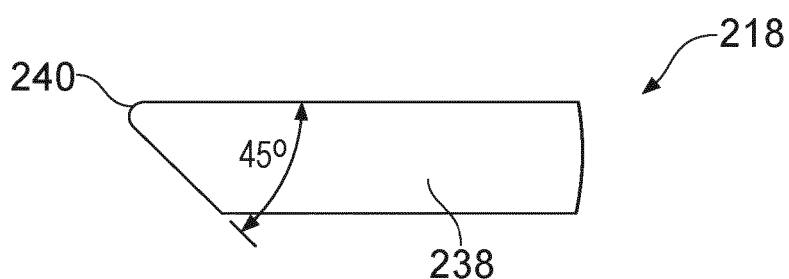
Figure 4A:
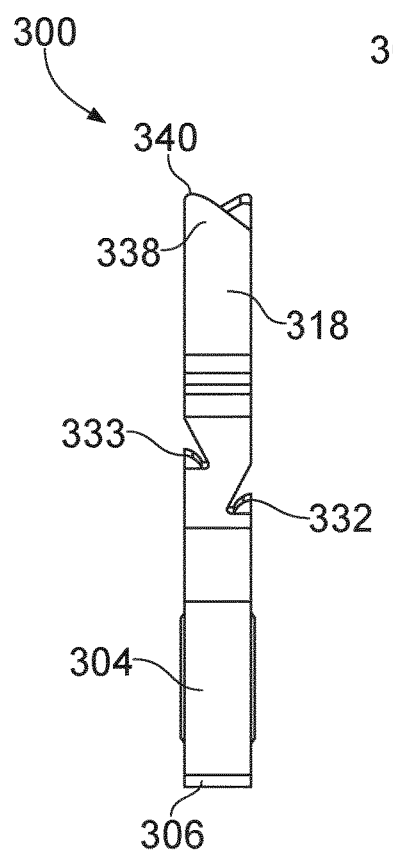
FIGS. 4A to 4D show alternative view of a further embodiment of a cable restraint of the present invention.
Figure 4B:
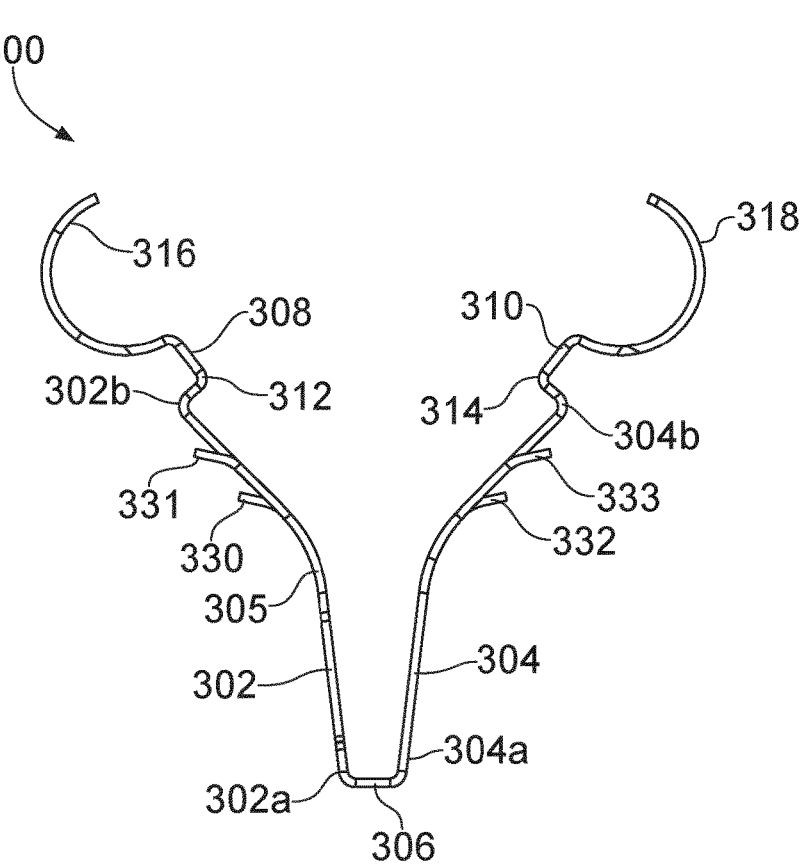
Figure 4C:
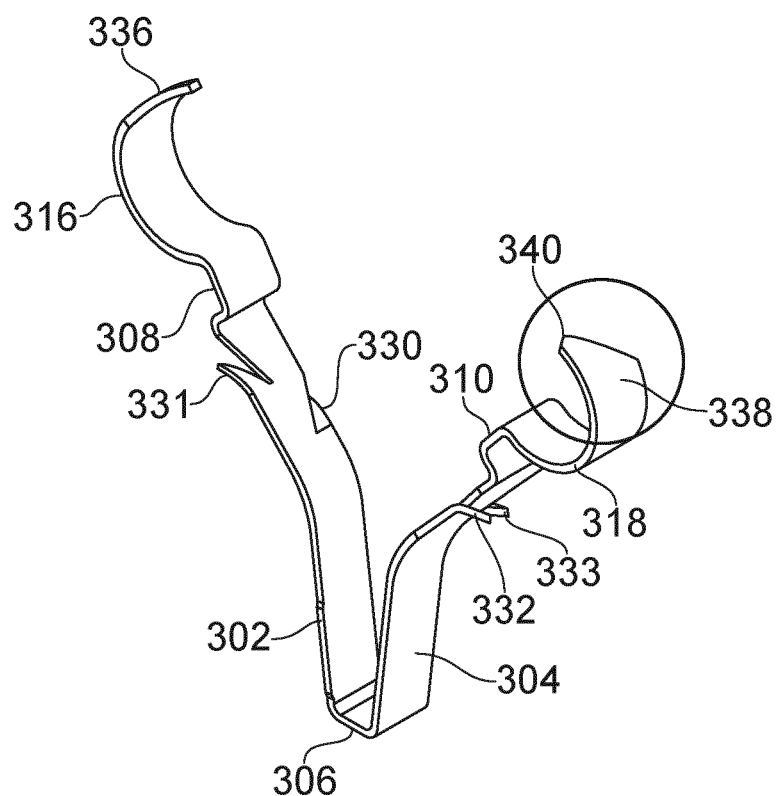
Figure 4D:
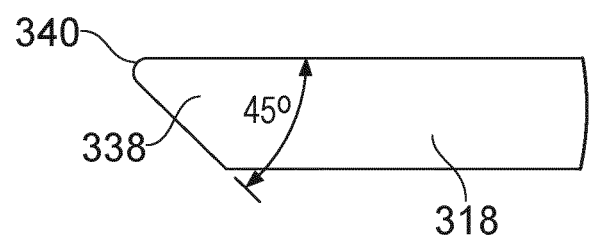
Figure 5A:
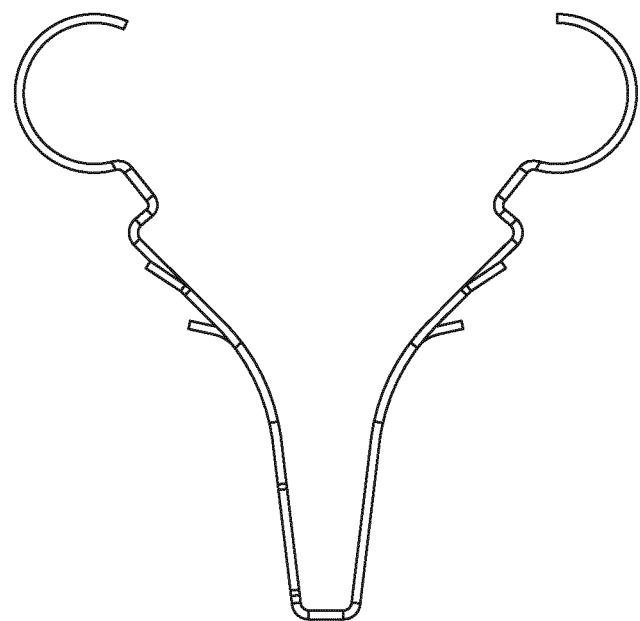
FIGS. 5A to 12B show alternative embodiments of cable restraints of the present invention.
Figure 5B:
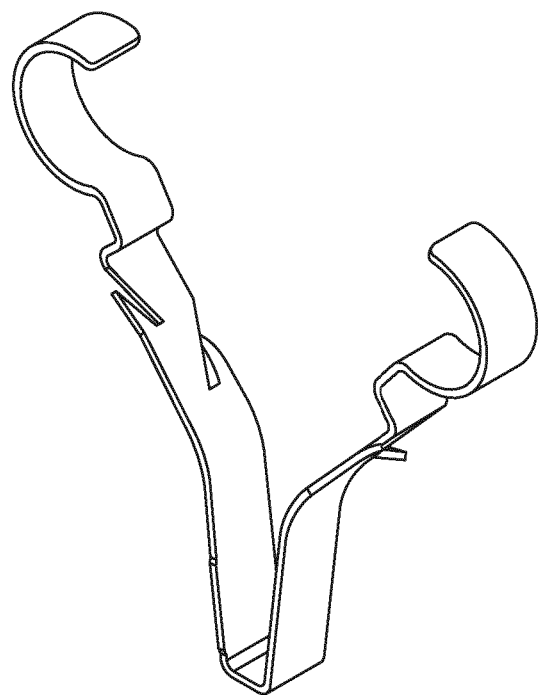
Figure 6A:
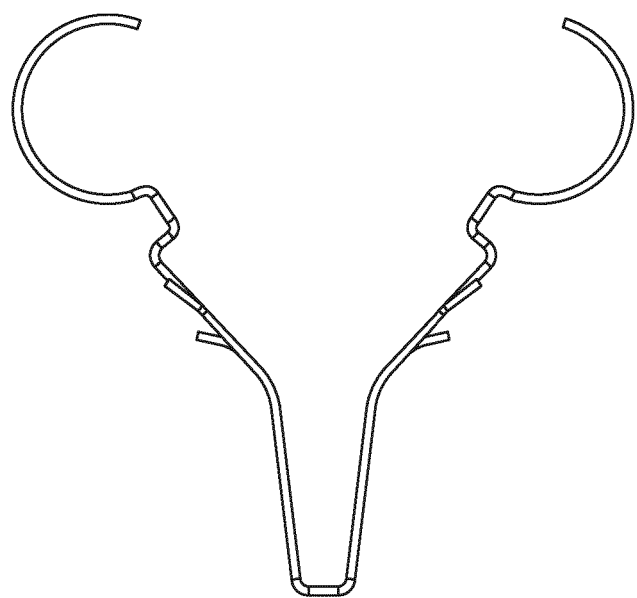
Figure 6B:
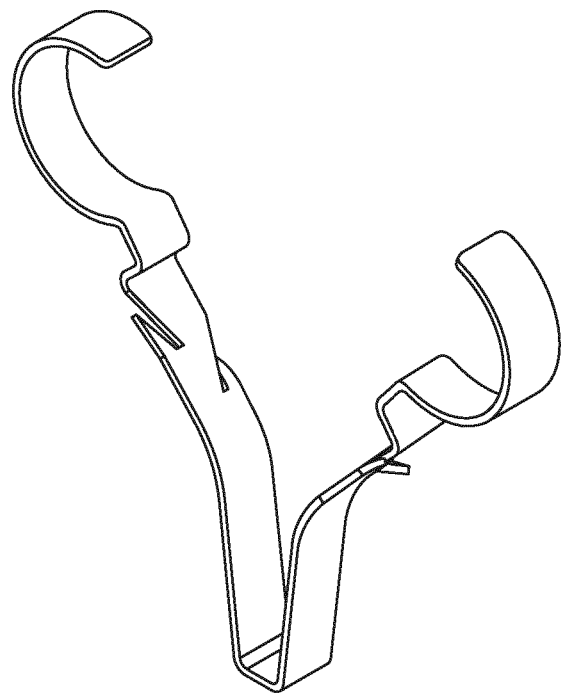
Figure 7A:
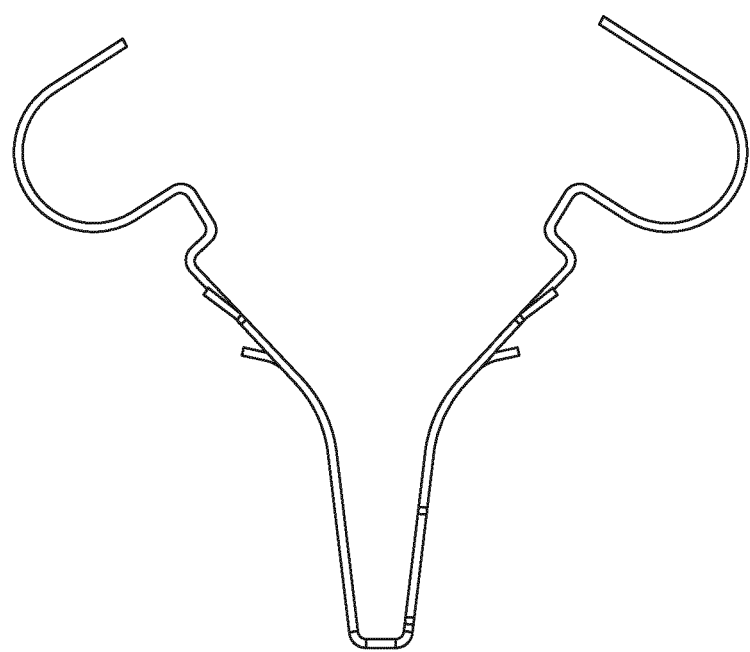
Figure 7B:
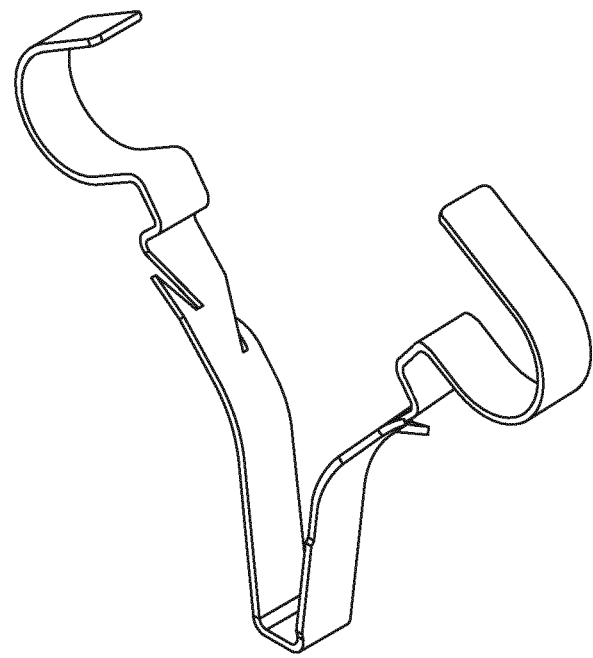
Figure 8A:
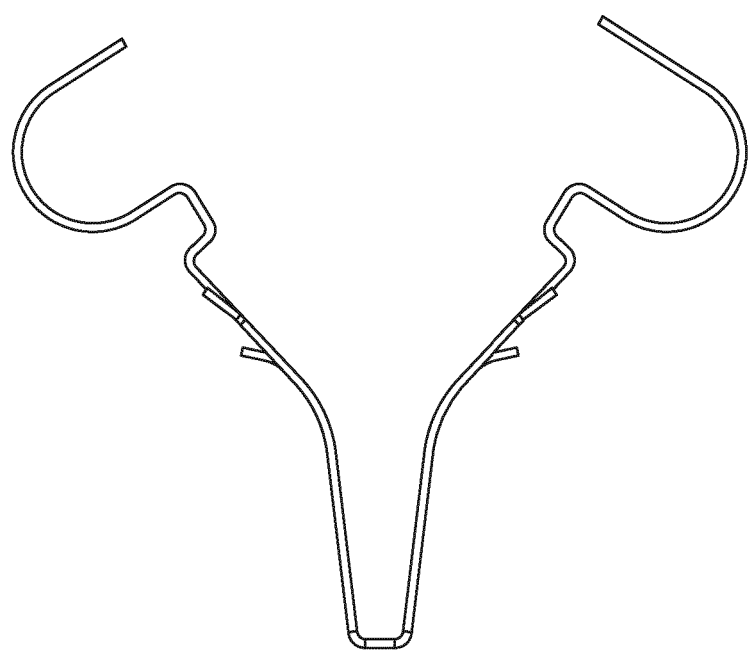
Figure 8B:
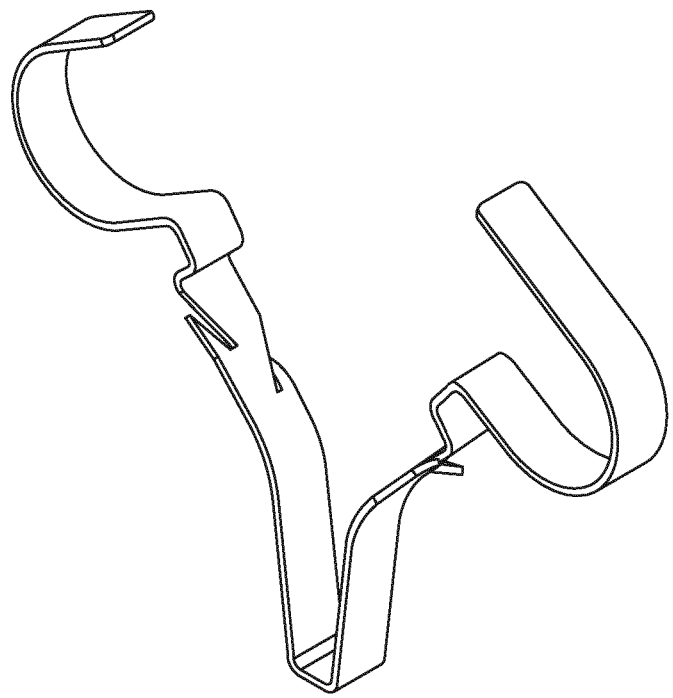
Figure 9A:
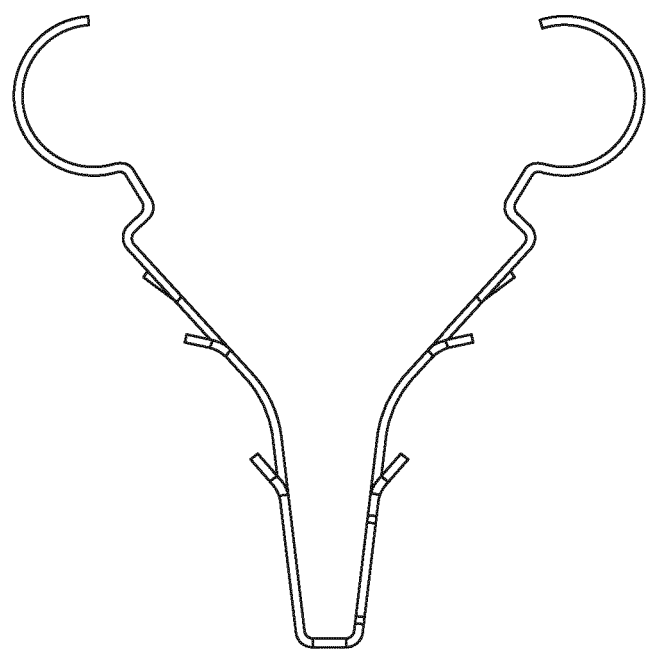
Figure 9B:
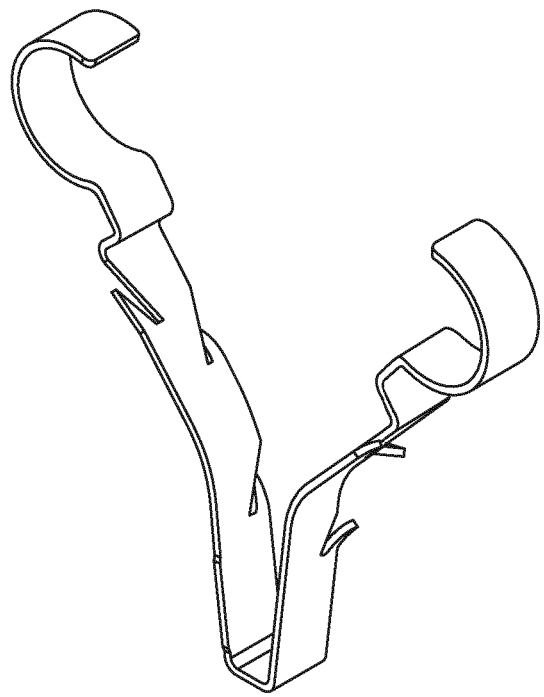
Figure 10A:
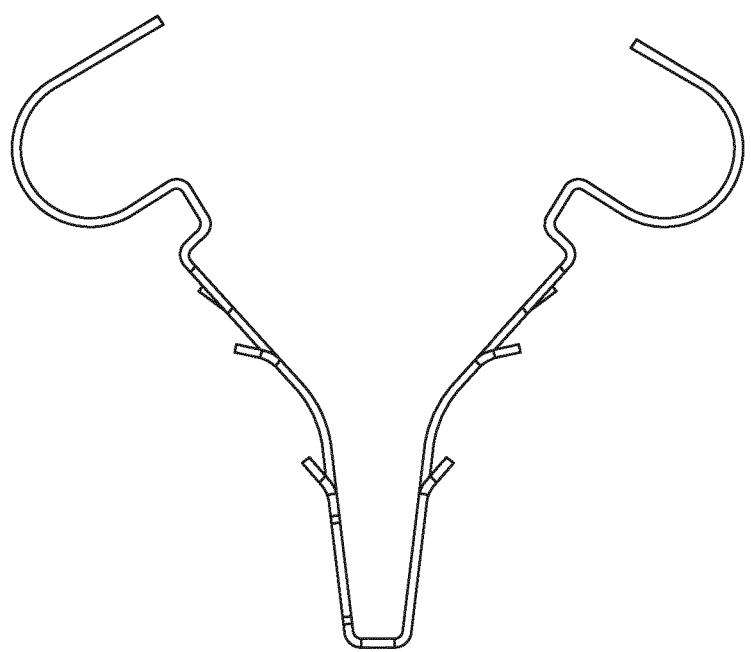
Figure 10B:
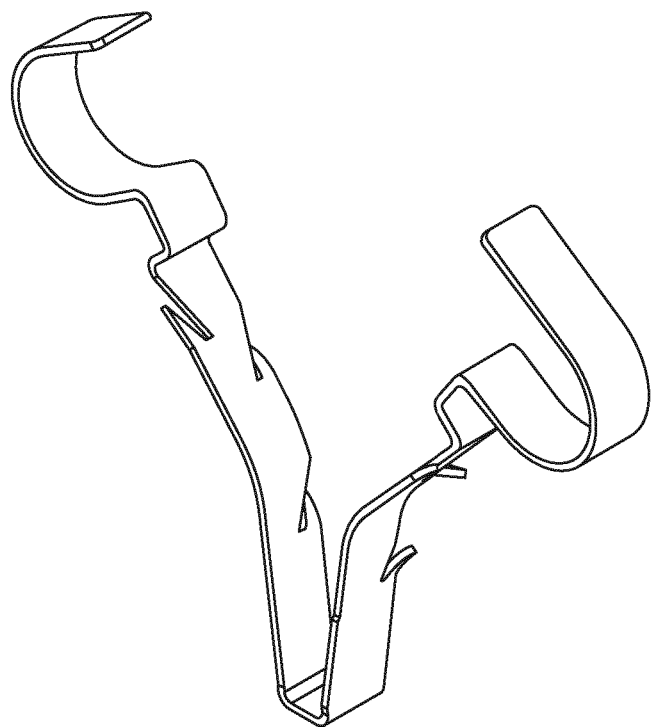
Figure 11A:
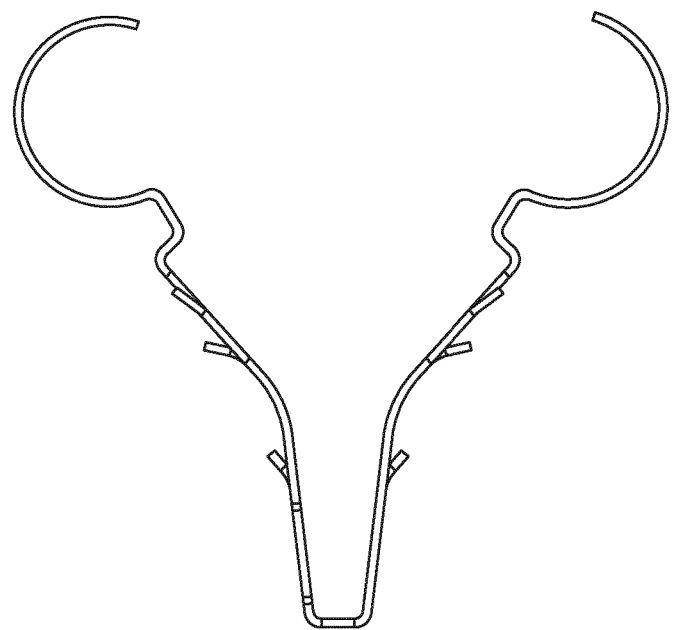
Figure 11B:
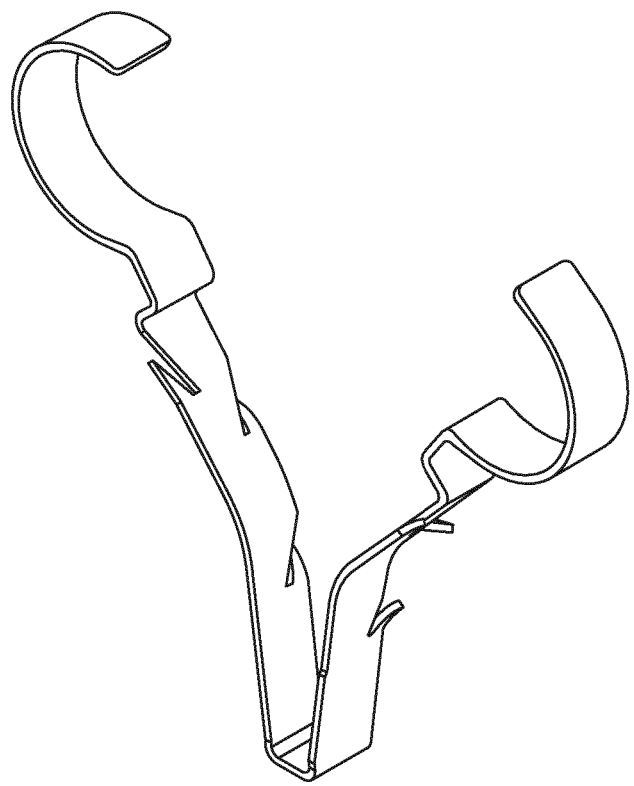
Figure 12A:
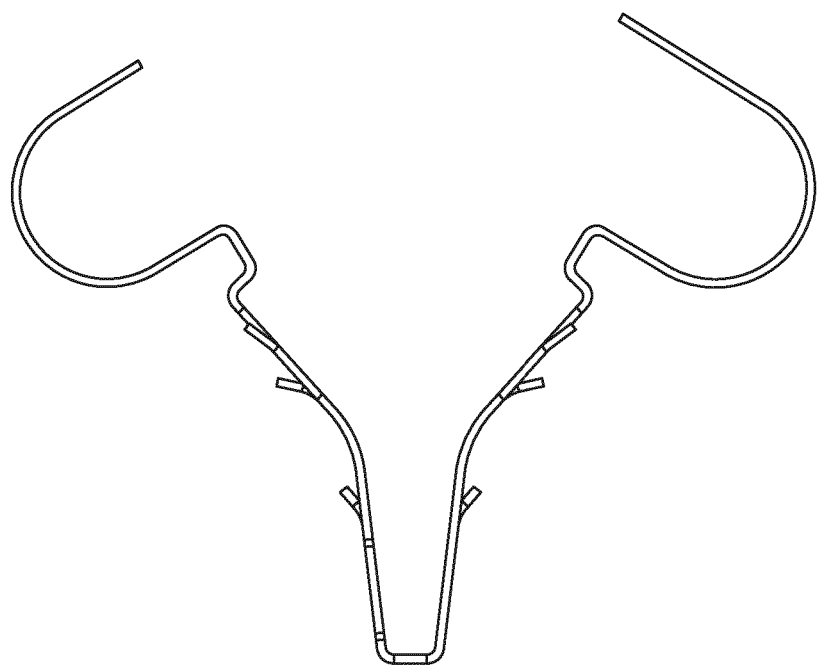
Figure 12B:
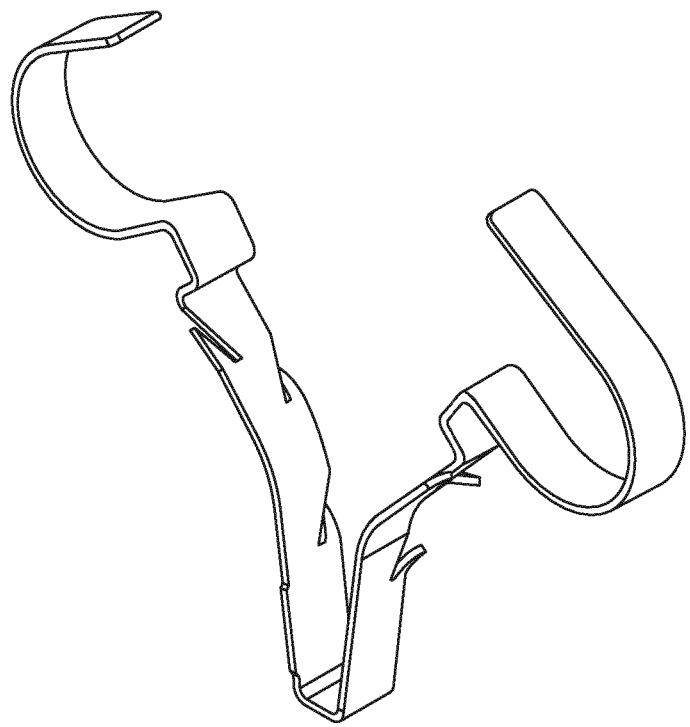

The closed configuration of the cable restraint 100 is shown in FIG. 2. The same reference numerals are used as in FIG. 1 for the same features. In the closed configuration, the entirety of each of the first arm 102 and the second arm 104 is now located inside the hole 1001. The abutment portions 108, 110 are in contact with each other. The cable restraint 100 is resiliently deformable, and biased into the open position. As a result, at the points $P_1$ to $P_4$, the first arm 102 and second arm 104 exert outward forces on the inner walls of the hole 1001. This outward force acts to secure the first arm 102 and second arm 104 (and accordingly, the whole cable restraint 100) inside the hole.

In the closed configuration, there is no longer a gap 120 between the first gripping portion 116 and the second gripping portion 118. In the embodiment shown, the first gripping portion 116 and second gripping portion 118 overlap in overlapping portion 126 to form a circular cable restraint channel 128. In use, as outlined earlier in this section, the cable (not shown) would pass through the cable restraint channel 128.

FIGS. 3A to 3D show an alternative embodiment of a cable restraint 200 of the present invention. In the following description, like numerals correspond to the same features as described in detail with reference to FIGS. 1 and 2. For conciseness, where these features are the same as in FIGS. 1 and 2B the description will not be repeated here, but we stress that it applies equivalently to the cable restraint 200 shown in FIGS. 3A to 3D.

In the embodiment of the cable restraint 200 of FIGS. 3A to 3D, each of the first arm 202 and the second arm 204 includes a barb 230, 232. The barbs 230, 232 are formed by creating a slot in the sheet of metal used to form the cable restraint 200, and folding the region of the sheet defined by the slot out of the plane of the arm 202, 204, in which the slot is formed. The barbs 230, 232 are formed by folding the sheet outwards, i.e. in the direction in which the first arm 202 or second arm 204 moves when the cable restraint 200 moves from a closed configuration to an open configuration. These outward facing barbs 230, 232 improve the strength with which the cable restraint 200 may be retained inside the hole. This is because when someone attempts to remove the cable restraint 200 from e.g. a wall, in which it is secured, the barbs 230, 232 dig into the surrounding wall preventing it from being removed further.

In addition to the presence of barbs 230, 232, the shapes of the distal ends of the first gripping portion 216 and second gripping portion 218 of the first arm 202 and second arm 204 respectively are pointed. This is shown most clearly in FIGS. 3C and 3D. The pointed section 234 here has an angle of 45°, but the skilled person is well-aware that various angles could be used. For safety purposes, the tip 236 of the pointed section 234 is rounded off. The pointed portion 234 of the first gripping portion 216 and the pointed portion 238 of the second gripping portion 218 are complementary, i.e. as shown clearly in FIG. 3C, the tips 236, 240 are on opposite sides. This means that when moving from the open configuration to the closed configuration, the tips 236, 240 do not clash, and the first gripping portion 216 and the second gripping portion 218 are able to overlap each other to provide a more secure cable restraint channel. The embodiment shown in FIGS. 4A to 4D differs from that shown in FIGS. 3A to 3D only in that the first arm 302 includes a pair of barbs 330, 331, and the second arm 304 includes a pair of barbs 332, 333.

FIGS. 5A to 12B show various alternative embodiments having different dimensions, and different shapes of cable restraint channel when in the closed configuration. In particular, FIGS. 7A to 8B show embodiments in which the cable restraint channel is rectangular with semi-circular ends. The embodiments shown in While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

The invention claimed is:

1. A cable restraint having:
a first arm, having a first proximal end, a first distal end, a first elbow located approximately halfway between the first proximal end and the first distal end, a first abutment portion at the first distal end, and a first gripping portion located at the opposite end of the first abutment portion from the first distal end;
a second arm, having a second proximal end, a second distal end, a second elbow located approximately halfway between the second proximal end and the second distal end, a second abutment portion at the second distal end, and a second gripping portion located at the opposite end of the second abutment portion from the second distal end; wherein:
the first proximal end is joined to the second proximal end;
the cable restraint is movable between:
an open configuration in which the first gripping portion and the second gripping portion are spaced from each other to define a gap into which a cable may be inserted, and
a closed configuration in which the first gripping portion and the second gripping portion cooperate with each other to define a cable restraint channel, and the first abutment portion is in contact with the second abutment portion; and
the cable restraint is configured to be movable from the open configuration to the closed configuration when the cable restraint is inserted into a hole or notch having a smaller width than the cable restraint.

2. A cable restraint according to claim 1, wherein in the open configuration, the gap defined by the first gripping portion and the second gripping portion is located on an opposite side of the first gripping portion from the first arm, and on an opposite side of the second gripping portion from the second arm.

3. A cable restraint according to claim 2, wherein in the open configuration, the first gripping portion is not in contact with the second gripping portion.

4. A cable restraint according to claim 1, wherein the cable restraint is resiliently deformable.

5. A cable restraint according to claim 1, wherein the cable restraint is biased into the open configuration.

6. A cable restraint according to claim 1, wherein the cable restraint is V-shaped or substantially V-shaped in the open configuration.

7. A cable restraint according to claim 1, wherein the first arm is pivotable towards the second arm, in order to move the cable restraint from the open configuration to the closed configuration.

8. A cable restraint according to claim 1, wherein the first proximal end is joined directly to the second proximal end.

9. A cable restraint according to claim 1, wherein the first proximal end is joined to the second proximal end via a connector portion.

10. A cable restraint according to claim 9, wherein the first arm, the second arm and, optionally, the connector portion are integrally formed with each other.

11. A cable restraint according to claim 10, wherein the first arm, the second arm and, optionally, the connector portion are formed from a single strip of material.

12. A cable restraint according to claim 11, wherein the material is metal.

13. A cable restraint according to claim 12, wherein the metal is sprung steel.

14. A cable restraint according to claim 1, wherein a top surface of the cable restraint channel defined by the first gripping portion and the second gripping portion in the closed configuration is rounded.

15. A cable restraint according to claim 1, wherein the first gripping portion and the second gripping portion are in contact with each other in the closed configuration.

16. A cable restraint according to claim 15, wherein the first gripping portion overlaps the second gripping portion in the closed configuration.

17. A cable restraint according to claim 14, wherein a cross-section of one or more of the first gripping portion and the second gripping portion is arcuate.

18. A cable restraint according to claim 17, wherein a cross-section of one or more of the first gripping portion and the second gripping portion is a circular arc.

19. A cable restraint according to claim 18, wherein the cable restraint channel defined by the first gripping portion and the second gripping portion is circular or substantially circular in cross-section.

20. A cable restraint according to claim 19, wherein a cross-section of the first gripping portion is semi-circular, and a cross-section of the second gripping portion is semi-circular.

21. A cable restraint according to claim 19, wherein a cross-section of the first gripping portion and a cross-section of the second gripping portion have different circumferential extents.

22. A cable restraint according to claim 1, wherein one or more of the first distal end and the second distal end include a pointed portion.

23. A cable restraint according to claim 1, wherein the first gripping portion and the second gripping portion are spaced apart to define a gap in the closed configuration, the gap being smaller than the gap defined by the first gripping portion and second gripping portion in the open configuration.

24. A cable restraint according to claim 1, wherein one or more of the first arm and the second arm includes one or more barbs that point towards the cable restraint channel when the cable restraint is in the closed configuration.

25. A cable restraint according to claim 24, wherein the one or more barbs are integrally formed with the arm in which they are located.

26. A cable restraint according to claim 25, wherein the one or more barbs comprise pointed portions of the arm in which they are located which have been bent out of the plane of the arm towards the outer surface of that plane of the arm.

27. A method of securing a cable to a surface using the cable restraint of claim 1, the surface having a notch or hole formed therein, the notch or hole having an edge, the method including the steps of:

while the cable restraint is in the open configuration:
   inserting the first proximal end and the second proximal end into the notch or hole such that part of the first arm or the second arm is in contact with the edge;
   locating the cable in the gap defined by the first gripping portion and the second gripping portion;
   pressing the cable restraint further into the notch or hole, such that a force exerted by the edge of the cable on the first arm or the second arm causes the cable restraint to move from the open configuration to the closed configuration, to secure the cable in the cable restraint channel so formed.

28. A cable restraint according to claim 1, wherein the first elbow defines an inflection point in the first arm and the second elbow defines an inflection point in the second arm such that the first arm is bent at the first elbow and the second arm is bent at the second elbow in the absence of external forces acting on the cable restraint.

* * * * *